United States Patent [19]

Brief et al.

[11] Patent Number: 5,566,203
[45] Date of Patent: Oct. 15, 1996

[54] INTELLIGENT REPEATER FUNCTIONALITY

[75] Inventors: David C. Brief, Palo Alto; Gregory L. DeJager, Campbell, both of Calif.; James R. Hamstra, Shorewood, Minn.

[73] Assignee: National Semiconductor Corp., Santa Clara, Calif.

[21] Appl. No.: 83,963

[22] Filed: Jun. 24, 1993

[51] Int. Cl.⁶ ............................. H03H 7/30; H04J 1/10; H04B 3/36
[52] U.S. Cl. ........................ 375/211; 370/75; 370/97
[58] Field of Search ........................... 375/211, 224, 375/377; 370/85.1, 85.2, 85.3, 85.6, 97, 75; 379/399, 219

[56] References Cited

U.S. PATENT DOCUMENTS

| | | | |
|---|---|---|---|
| 4,530,088 | 7/1985 | Hamstra et al. | 370/110.1 |
| 4,706,081 | 11/1987 | Hart et al. | 340/825.03 |
| 4,878,219 | 10/1989 | Kaufman et al. | 370/97 |
| 5,164,960 | 11/1992 | Wincn et al. | 375/10 |
| 5,222,130 | 6/1993 | Pflueger et al. | 379/399 |
| 5,299,195 | 3/1994 | Shah | 370/85.6 |
| 5,321,819 | 6/1994 | Szczepanek | 395/325 |
| 5,333,270 | 6/1994 | Brief et al. | 395/200 |
| 5,396,495 | 3/1995 | Moorwood et al. | 370/85.11 |
| 5,438,571 | 8/1995 | Albrecht et al. | 370/94.3 |
| 5,442,628 | 8/1995 | Anderson et al. | 370/56 |

*Primary Examiner*—Edward L. Coles, Sr.
*Assistant Examiner*—Madeleine Au Nguyen
*Attorney, Agent, or Firm*—Skjerven, Morrill, MacPherson, Franklin & Friel; Michael Shenker; E. Eric Hoffman

[57] ABSTRACT

A physical layer (PHY) device which can operate as a conventional PHY or as an intelligent repeater in a communication system. The PHY device supports four optional modes which may be enabled by programming control register bits with a microcontroller. These optional modes are: pass all symbols, enable noise filter, pass violation symbols and pass line states. During operation as an intelligent repeater, the pass all symbols, pass violation symbols and pass line states modes are enabled. The intelligent repeater allows errors in a data stream to be encoded and repeated without filtering to a downstream station. The intelligent repeater also allows line states to be repeated without station management software. A single intelligent repeater may be used to couple two stations or multiple intelligent repeaters may be connected to form multi-port repeater boxes which can be connected to facilitate more reliable connections between stations.

23 Claims, 8 Drawing Sheets

INTELLIGENT REPEATER FUNCTIONALITY

CROSS-REFERENCE TO RELATED APPLICATIONS

This application is related to, and incorporates by reference, the following U.S. patent applications filed on the same date as the present application: the application entitled "Method and Apparatus for Trace Propagation in a Ring Network" filed by David C. Brief, Robert L. Macomber and James R. Hamstra, Ser. No. 08/082,678; the application entitled "Elasticity Buffer Control Method" filed by James R. Hamstra and David C. Brief, Ser. No. 08/082,193; the application entitled "Hybrid Loopback for FDDI-II Slave Stations" filed by David C. Brief, Ser. No. 08/083,111; and the application entitled "Link Error Monitoring" filed by David C. Brief, James F. Torgerson, and James R. Hamstra, Ser. No. 08/083,591. This application also relates to U.S. Pat. No. 5,046,182, entitled "Code Points for Transferring Data from a Network Transmission Medium to a Station on the Network."

FIELD OF THE INVENTION

The present invention relates to FDDI based data communications systems, and in particular, to a physical layer (PHY) device used as an intelligent repeater to couple segments of an FDDI-I or FDDI-II based data communication system where there are distance limitations or changes of media type (e.g., optical fiber to copper) which necessitate that data be repeated from one transmission segment onto another.

BACKGROUND OF THE INVENTION

One type of high speed data transmission network is defined by the Fiber Distributed Data Interface (FDDI) protocol. The FDDI protocol is an American National Standards Institute (ANSI) data transmission standard which applies to a 100 Mbps (Megabit per second) token ring network. The FDDI protocol is intended as a high performance interconnection between a number of computers as well as between the computers and their associated mass storage subsystems and other peripheral equipment.

Information is transmitted on an FDDI ring in frames (in FDDI-I) and cycles (in FDDI-II) that consist of 5-bit characters or "symbols", each symbol representing 4 data bits. Tokens are used to signify the right to transmit data between stations on the network. A "station" can include, for example, a computer (PC), a media access controller (MAC), station management (SMT) and a Physical layer device (PHY).

Of the thirty-two possible 5-bit symbol codes, 16 are data symbols (each representing four bits of ordinary binary data), 8 are control symbols, and 8 are violation symbols. The eight control symbols include J (the first symbol of a starting delimiter byte JK), K (the second symbol of the starting delimiter byte JK), I (Idle), H (Halt), Q (Quiet), T (End delimiter), S (Set), R (Reset), and L (Limiter). The violation symbols of the FDDI standard symbol set are not used because they violate code run length or DC balance requirements of the protocol.

Line states represent a long term condition of the link and therefore cannot be represented by a symbol or symbol pair. A continuous stream of control symbol patterns defines a line state. The FDDI protocol defines seven line states, including Idle Line State (ILS), Quiet Line State (QLS), Halt Line State (HLS), Master Line State (MLS), Reception of a start delimiter symbol pair JK (ALS), Noise Line State (NLS) and Line State Unknown (LSU). These line states are used to monitor and control the operation of the link. Line states are transferred between two stations to establish operational links, to monitor link quality and to provide for time-outs.

A repeater is sometimes required between a transmitting and receiving FDDI station. The repeater may be necessary to boost a signal which must be transmitted over a long physical distance between the transmitting and receiving stations. In another application, the repeater interconnects two segments of a path having different transmission media, such as optical fiber and copper.

In PHY devices previously used as repeaters, FDDI-I and FDDI-II standards are followed to filter the stream of 5-bit symbols that enters the repeater. Thus, when receiving a frame (i.e., operating in basic mode, i.e., FDDI-I mode), the PHY device will replace violation symbols with four Halt symbols followed by an Idle line state. This Idle line state is transmitted to a downstream receiving station until the repeater receives the next frame of data. When receiving cycles (i.e., operating in hybrid mode, i.e., FDDI-II mode), the PHY device will replace a violation symbol with an L symbol. When receiving neither frames nor cycles, violations are replaced with idle symbols.

The link errors are transferred into valid symbols and these errors are not detected and counted by the downstream receiving stations. Thus, the error count at the downstream station can be deceptively low, making the link between the upstream transmitting station and downstream receiving station appear to be in a better condition than it actually is. The link error processing is consequently impeded.

Another drawback of the conventional PHY repeaters is that they require software support from their associated station management (SMT) to process line state information. Upon detecting a line state from an upstream transmitting station, the repeater encodes the line state information and provides this encoded information to the SMT. Based on the particular line state received and other conditions on the FDDI system, the SMT software determines which line state should be transmitted. The SMT instructs a transmitter device within the repeater to generate this line state and send it to a downstream receiving station. The necessity for this software processing results in slower propagation of line state information. This lowers the limit on the number of repeaters that can be connected in series between two stations.

It is therefore desirable to have a PHY device which operates as an intelligent repeater which is able to repeat line state information without support from station management software. It is also desirable to have a PHY device which operates as a repeater which does not correct link errors. It is also desirable to have a PHY device which operates as an intelligent repeater that passes errors received to downstream receiving stations. It is also desirable to have a PHY device which can operate in both a conventional PHY repeater mode and in an intelligent repeater mode.

SUMMARY OF THE INVENTION

Accordingly, the present invention provides a physical layer device which operates as an intelligent repeater which allows errors to be encoded and transmitted as violation symbols to downstream receiving stations. In addition, this intelligent repeater is able to repeat line state information without station management software. The PHY device of one embodiment of the present invention provides for operation in a conventional PHY repeater mode and in an intelligent repeater mode. The intelligent repeater mode is selected by using a microcontroller to program bits in a control register when the repeater is turned on. The present invention also provides a PHY device which allows for the flexible interconnection of PHYs within an FDDI station. Other features and advantages of the invention are described below. The invention is defined by the appended claims.

DETAILED DESCRIPTION OF THE INVENTION

Figure 1:
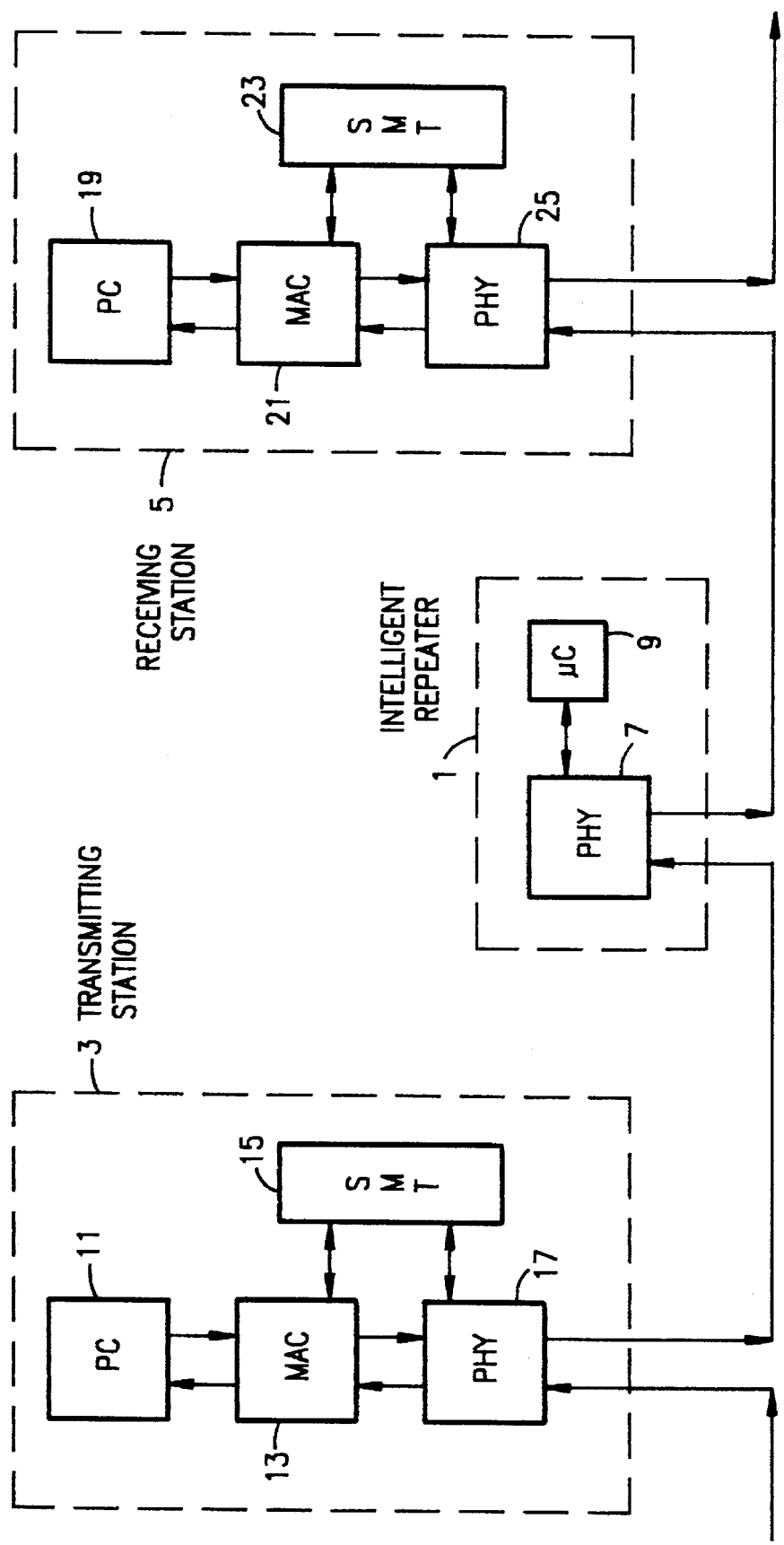
FIG. 1 is a block diagram showing the PHY device of the present invention connected as an intelligent repeater between two stations.
Figure 2:
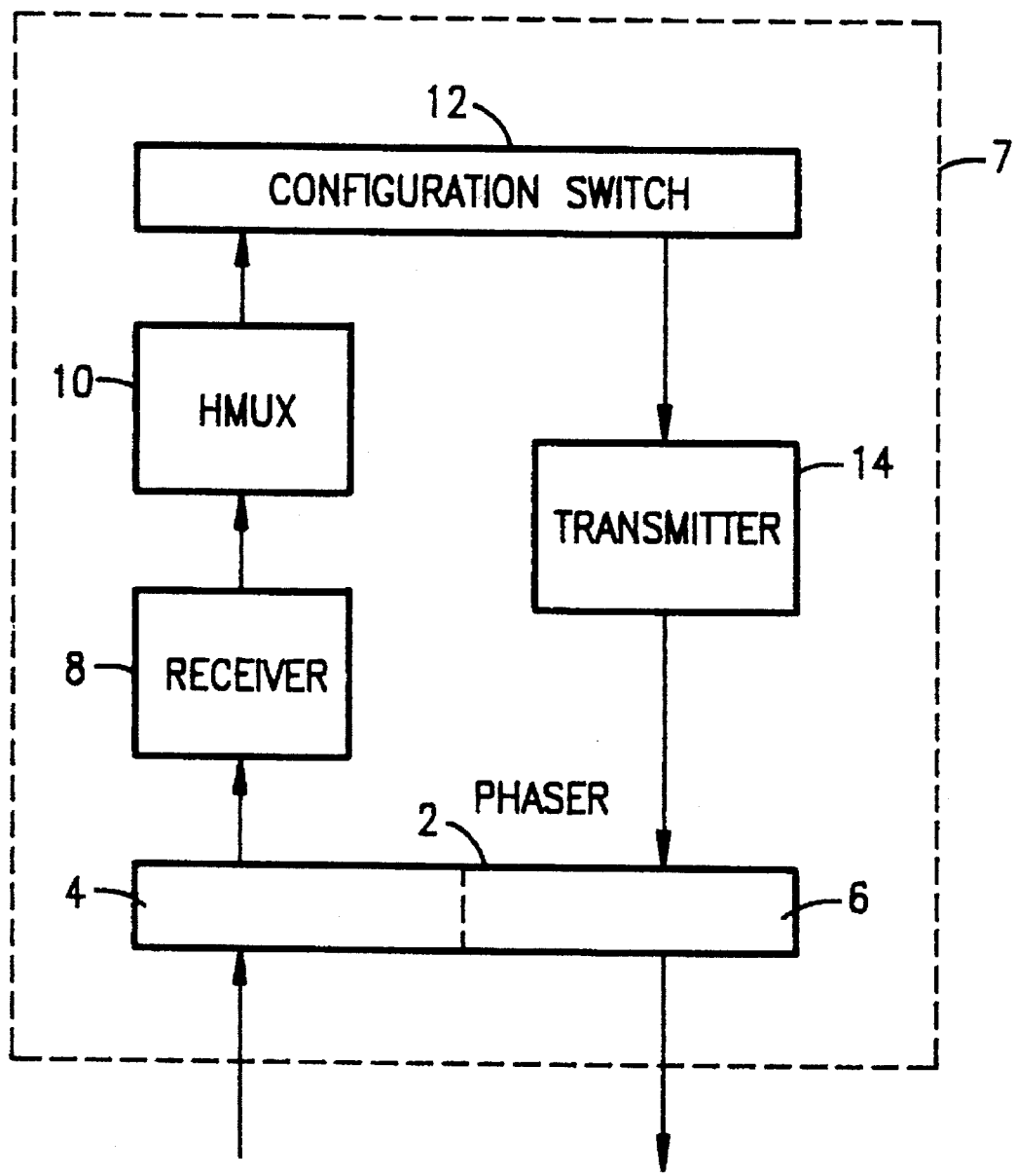
FIG. 2 is a block diagram of the PHY device of the present invention configured as an intelligent repeater.

In FIG. 1, a PHY device 7 is configured to operate as an intelligent repeater between a transmitting station and a receiving station 5. The intelligent repeater includes PHY device 7 and microcontroller 9. The transmitting station 3 includes PC 11, MAC 13, SMT 15 and PHY 17. The receiving station 5 includes PC 19, MAC 21, SMT 23 and PHY 25. FIG. 2 is a block diagram of the functional blocks of the PHY device 7 of the intelligent repeater 1, including the phaser 2, receiver 8, HMUX 10, configuration switch 12 and transmitter 14. The receiver 8, configuration switch 12 and transmitter 14 are shown in more detail in FIGS. 3, 4, and 5, respectively. The functions performed by the various blocks are described below. The detailed structure of the intelligent repeater is set forth in the state diagrams and pseudo-code in Appendix 1.

Turning now to FIG. 2, the phaser 2 includes a clock recovery block 4 and a clock generation block 6. The clock recovery block 4 extracts the stream of 5-bit symbols and the synchronized 125 Mhz clock from the incoming data stream and provides these signals to the receiver block 8. Phasers such as phaser 2 are known in the art. A detailed description of such a phaser is provided in National Semiconductor's data sheet for the DP83256/DP83257 PLAYER+ Device, which is herein incorporated by reference.

The Receiver Block

Figure 3:
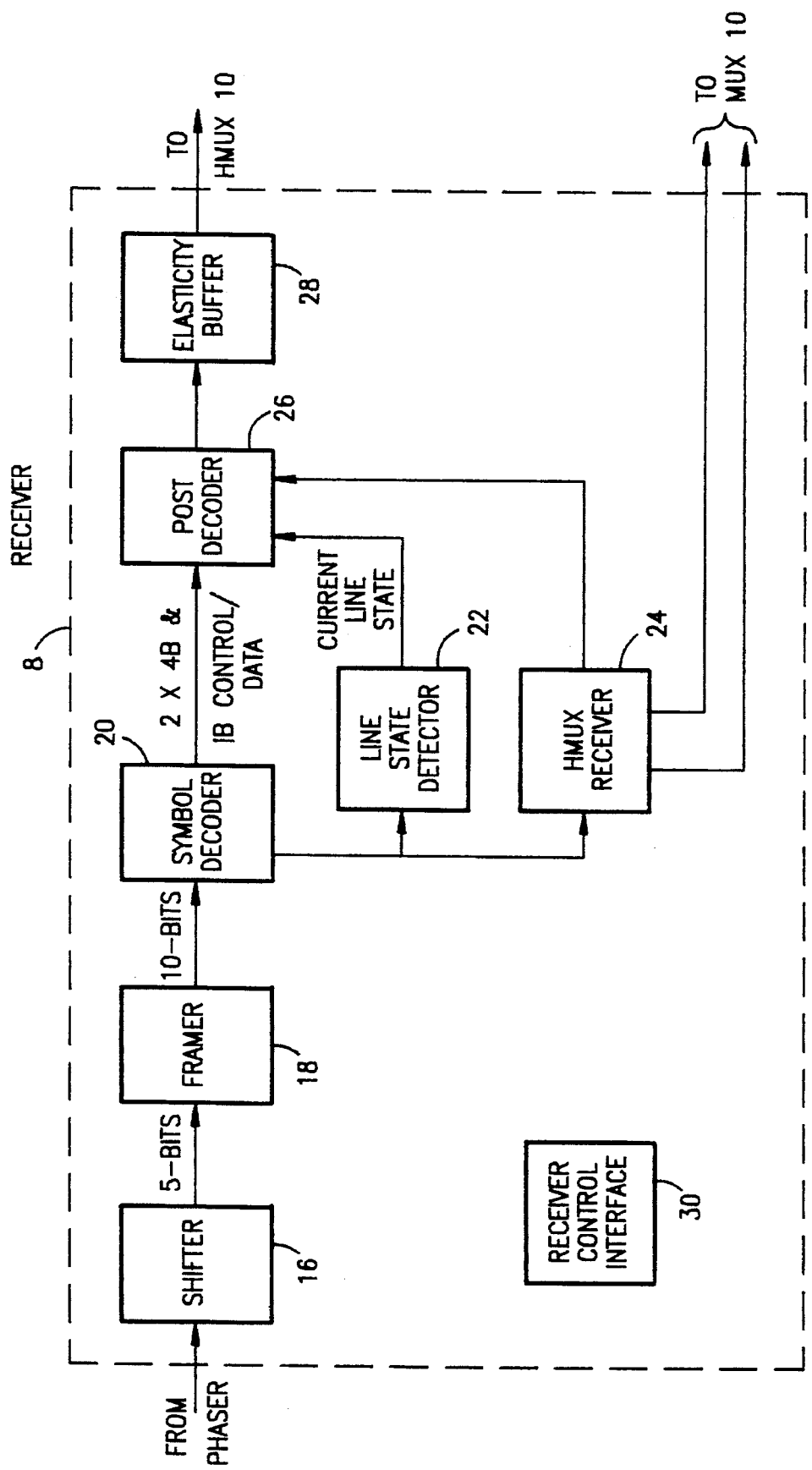
FIG. 3 is a block diagram of the receiver of the PHY device of the present invention.

The receiver block 8 is shown in more detail in FIG. 3. The serial data from phaser 2 is input to a shifter 16 which performs a high speed serial to parallel conversion along with an NRZI (Non-Return-to-Zero-Invert-On-Ones) to NRZ (Non-Return-to-Zero) conversion, if necessary.

The shifter 16 provides a stream of 5-bit symbols to the framer 18. The framer 18 combines pairs of 5-bit symbols to produce a 10-bit byte stream that is aligned with the current symbol boundary as defined by the received starting delimiters and line state patterns.

The symbol decoder 20 receives the aligned pairs of 5-bit symbols from the framer 18 and encodes each pair into a pair of 4-bit symbols. An additional bit is included with the pair of 4-bit symbols to indicate whether the pair of 4-bit symbols represent data values or control symbols. The conversion from 5-bit data symbols to 4-bit data symbols is illustrated in the upper portion of Table A. Thus, the pair of 5-bit data symbols, 01001 10100, is converted to the pair of 4-bit data symbols, 0001 0010, plus an additional bit which indicates these are data values, rather than control signals.

The conversion from pairs of 5-bit control signals to pairs of 4-bit control signals is illustrated in the lower portion of Table A and in Table B. First, the letters corresponding to the pair of 5-bit control symbols are determined from the lower portion of Table A. For example, the letters corresponding to the pair of 5-bit control symbols, 11110 00001 are NV. Next, the pair of 4-bit control symbols corresponding to these letters is determined from a set of internal codes shown in Table B. Thus, NV becomes 0000 0010, plus an additional bit which indicates this is a control symbol, rather than a data symbol.

TABLE A

| 5B-4B Symbol Encoding | | |
|---|---|---|
| Symbol | 5B Code | Outgoing 4B |
| 0 | 11110 | 0000 |
| 1 | 01001 | 0001 |
| 2 | 10100 | 0010 |
| 3 | 10101 | 0011 |
| 4 | 01010 | 0100 |
| 5 | 01011 | 0101 |
| 6 | 01110 | 0110 |
| 7 | 01111 | 0111 |
| 8 | 10010 | 1000 |
| 9 | 10011 | 1001 |
| A | 10110 | 1010 |
| B | 10111 | 1011 |
| C | 11010 | 1100 |
| D | 11011 | 1101 |
| E | 11100 | 1110 |
| F | 11101 | 1111 |
| I (Idle) | 11111 | |
| Q (Quiet) | 00000 | |
| H (Halt) | 00100 | |
| J (Starting Delimiter) | 11000 | |
| K (Starting Delimiter) | 10001 | |
| T (Ending Delimiter) | 01101 | |
| R (Reset) | 00111 | |
| S (Set) | 11001 | |
| L (Starting Delim) | 00101 | |
| N (Data w/Code) | 11110 | |
| V (Violation) | 00001 | |
| V | 00010 | |
| V | 00011 | |
| V | 00110 | |
| V | 01000 | |
| V | 01100 | |
| V | 10000 | |

Note:
See Table B for 4-Bit Control Symbol Pairs

TABLE B

4-Bit Control Symbol Pairs Generated by Receiver and HMUX

| Lower Symbol | | Upper Symbol | | | | | | | | | | | | | | | |
|---|---|---|---|---|---|---|---|---|---|---|---|---|---|---|---|---|---|
| | | 0000 N | 0001 H | 0010 V | 0011 Vx | 0100 L | 0101 T | 0110 R | 0111 S | 1000 | 1001 | 1010 I | 1011 Ix | 1100 Px | 1101 J | 1110 Px | 1111 Px |
| 0000 | N | | | HN | VN | | LN | TN | RN | SN | | | IN | kALS | | | | |
| 0001 | H | NH | HH | VH | | LH | TH | RH | SH | | | IH | kILS | | | | |
| 0010 | V | NV | HV | VV | kNSD | LV | TV | RV | SV | | | IV | PSTP | | | HSTP | |
| 0011 | | | | | PERR | | | | | | | | KCLS | | | IERR | |
| 0100 | L | NL | HL | VL | kMLS | LL | TL | RL | SL | | | IL | | | | | |
| 0101 | T | NT | HT | VT | kHLS | LT | TT | RT | ST | | | IT | | | SMC | | |
| 0110 | R | NR | HR | VR | kQLS | LR | TR | RR | SR | | | IR | | | | | |
| 0111 | S | NS | HS | VS | kNLS | LS | TS | RS | SS | | | IS | kNLS | | SSC | | |
| 1000 | | | | | uALS | | | | | | | | uALS | | | | |
| 1001 | | | | | uILS | | | | | | | | uILS | | | | |
| 1010 | I | NI | HI | VI | EBo/u | LI | TI | RI | SI | | | II | smPIV | | SAS | | |
| 1011 | Y | | | | uCLS | | | | | | | | uCLS | | SCC | | |
| 1100 | | | | | uMLS | | | | | | | | uMLS | | | | |
| 1101 | K | | | | uHLS | | | | | | | | uHLS | | SFS | | |
| 1110 | | | | | uQLS | | | | | | | | uQLS | | P | | |
| 1111 | | | | | uNLS | | | | | | | | uNLS | | P | | |

The symbol decoder 20 also decodes line state symbols. This information is provided to line state detector 22 which determines the current line state. The line states recognized by the line state detector 22 include the following. A quiet line state (QLS) is identified upon the receipt of 8 consecutive quiet symbol pairs. The halt line state (HLS) is identified upon the receipt of eight consecutive halt symbol pairs. The master line state (MLS) is identified upon the reception of eight consecutive halt-quiet symbol pairs. The idle line state (ILS) is identified upon the reception of two consecutive idle symbol pairs. The super idle line state is identified upon the reception of eight consecutive idle symbol pairs. The active line state (ALS) is identified upon the reception of the starting delimiter. The cycle line state (CLS) is identified when hybrid mode is enabled upon the reception of an R or S symbol pair while in active line state immediately after the starting delimiter. The no signal detect (NSD) state is identified upon the desassertion of the signal detect status input. The noise line state (NLS) is identified upon the reception of sixteen erroneous symbol pairs without satisfying the criteria for entry to another line state.

The line state unknown (LSU) state is identified upon the reception of a symbol pair that causes exit from the current known line state without causing entry to a new line state. For example, if the last eight consecutive symbol pairs received were quiet symbol pairs, the current line state would be known to be QLS. This line state is represented as kQLS in Table B, for known QLS. If the next symbol pair received consists of halt symbols, the current line state is unknown, and would be represented as uQLS, for unknown QLS. The current line state would remain unknown (uQLS) until enough symbol pairs were received to identify the line state. For instance, if halt symbol pairs continued to be received, the current line state would be identified as HLS (kHLS) upon receipt of the eighth consecutive halt symbol pair.

The line state detector 22 uses the line state information received from the symbol decoder 20 to generate a pair of 4-bit symbols representing the current line state (along with an additional bit which indicates that the pair of 4-bit symbols represents a control symbol). The appropriate conversion is defined by Table B. The $I_x$ column is used if an idle symbol pair was received as input within a line state, otherwise, the $V_x$ column is used. Therefore, for a known halt line state, the appropriate 4-bit symbol pair is 0011 0101, and for a known idle line state, the appropriate 4-bit symbol pair is 1011 0001.

The output of line state detector 22 is provided to post decoder 26. The post decoder 26 receives input from symbol decoder 20, line state detector 22 and HMUX receiver 24 and provides an output to elasticity buffer 28. While data is being received, the post decoder 26 routes the output of the symbol decoder 20 to the elasticity buffer 28. While line state information is being received, the output of the line state detector 22 is routed through the post decoder 26 to the elasticity buffer 28.

The HMUX receiver 24 monitors the incoming data stream for FDDI-II data and checks the validity of identified cycles. The results of these validity tests are passed to the HMUX block 10 to assist in further processing. HMUX receiver 24 also provides control signals to post decoder 26 to cause decoder 26 to filter information.

The elasticity buffer 28 functions as a logical FIFO buffer to compensate for the variation between the recovered receive clock and the local clock. The output of the elasticity buffer 28 is transmitted through the HMUX block 10 to the configuration switch 12. The HMUX block 10 performs the functions defined in FDDI Hybrid Ring Control American National Standard.

Within the receiver block 8, the receiver control interface 30 contains control and status registers which provide an interface to an external device such as a microcontroller or a station management block. During operation as an intelligent repeater as shown in FIG. 1, a microcontroller 9 programs two bits in a control register within receiver control interface 30. Each of these two bits enables a separate feature within the receiver 8.

One of these features is a pass all symbols mode. This mode is enabled for operation as an intelligent repeater as illustrated in FIG. 1. When the pass all symbols mode is enabled, control signals from HMUX receiver 24 allow post decoder 26 to pass all symbols without filtering. All symbols, including violation symbols and symbols which are not valid in their present context are propagated through the receiver 8, HMUX block 10, and configuration switch 12 without filtering. Symbol decoder 20 converts violation symbols to a V symbol, which is a violation symbol. When the violation symbol follows a J symbol, J is also replaced by V. Therefore, these symbols will be provided to the transmitter 14 and ultimately to the downstream receiving station 5. The downstream station 5 therefore gets informed of every violation symbol.

If the pass all symbols mode is not enabled, the HMUX receiver 24 causes post decoder 26 to filter violation symbols and any other symbols which are not valid in their present context. An example of a symbol which is not valid in its present context is an R symbol which appears in the preamble of a frame. If pass all symbols is enabled, the R symbol will be passed without filtering. However, if pass all symbols is not enabled, the R symbol will be replaced with an idle symbol (since the idle symbol would properly appear in a preamble).

The other feature which may be enabled by the receiver control interface 30 is a noise filtering mode. When the noise filter is enabled, the line state detector 22 monitors the duration of any noise line state (NLS) received. When noise line state is received for a period of time longer than a preselected threshold time period, post decoder 26 inserts the quiet line state (QLS) control code, rather than the noise line state control code until a valid line state (ILS, HLS, MLS, QLS or NSD) is received by the line state detector 22. When the downstream receiving station 5 receives the quiet line state, the SMT 23 within the receiving station 5 will break the connection and may subsequently initiate line state signaling in an attempt to re-initialize the connection with the upstream transmitting station 3.

If the noise filter is not enabled, the intelligent repeater 1 will pass all noise line states (NLS) through to the downstream receiving station 5 unfiltered. During operation as an intelligent repeater as illustrated in FIG. 1, the noise filter may be enabled or disabled by microcontroller 9. In either case, a noise condition that exceeds the preselected threshold time period is always reported to microcontroller 9.

The Configuration Switch

Figure 4:
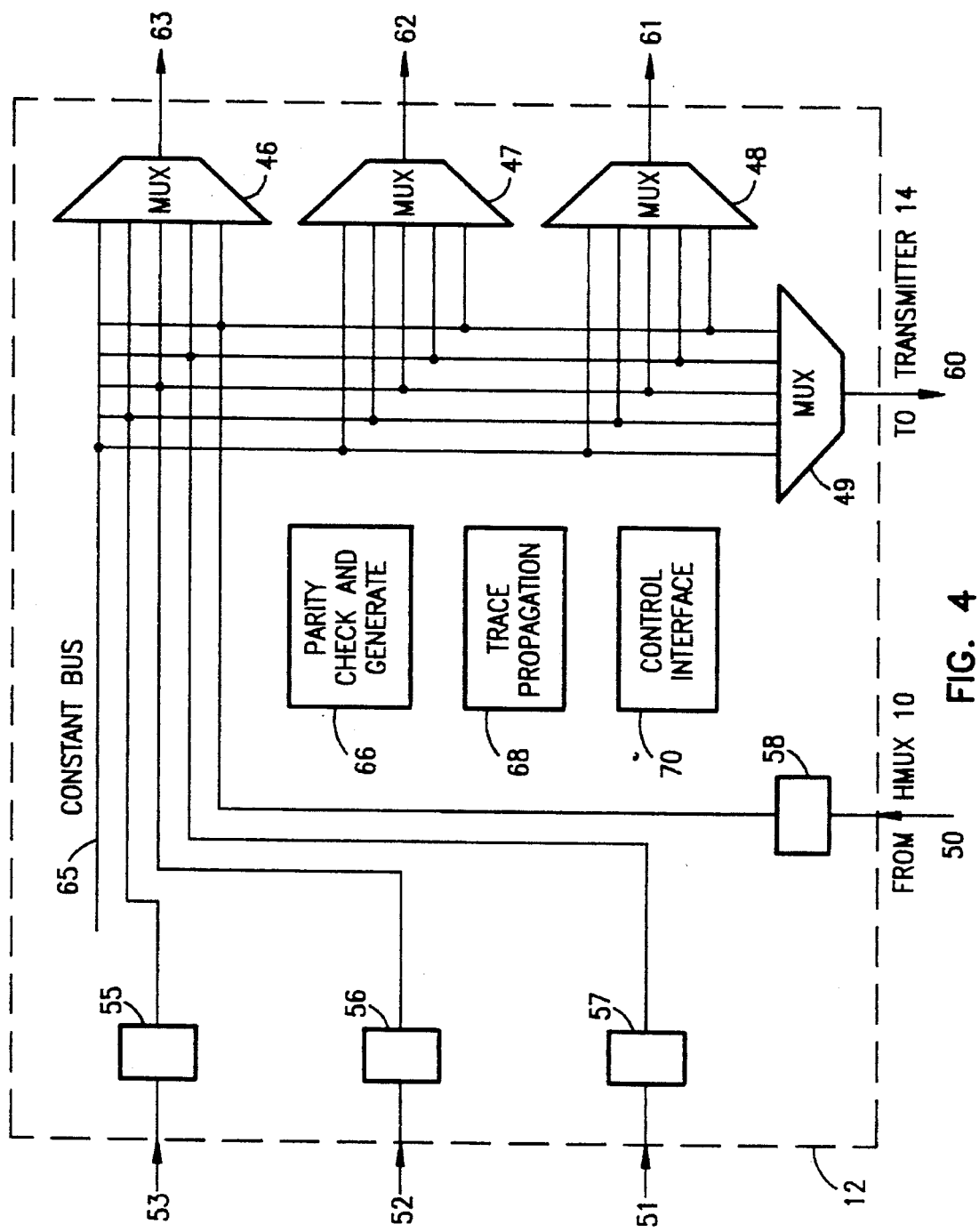
FIG. 4 is a block diagram of the configuration switch of the PHY device of the present invention.

As shown in FIG. 4, the configuration switch 12 consists of four inputs 50–53 and four outputs 60–63. A set of internal multiplexers 46–49 and latches 55–58 allow data path reconfiguration without the need for external multiplexers. The configuration switch 12 also includes a constant bus 65, a logic block 66 to check and generate parity, a trace propagation block 68 and a control interface block 70. The output of HMUX block 10 is connected to input 50 within the PHY device 7. The output 60 of multiplexer 49 is connected to the transmitter block 14 within the PHY device 7. In the intelligent repeater embodiment shown in FIG. 1, the internal multiplexers 46–49 are set so that a closed data path exists between input 50 and output 60. Inputs 51–53 and outputs 61–63 are not used when the PHY is in the repeater mode shown in FIG. 1. In an alternative embodiment, a bidirectional repeater function is performed by interconnecting two intelligent repeaters via their external interface ports 51–53 and 61–63.

The internal multiplexers 46–49 may also be set such that a closed data path is formed between: input 50 and any of the external outputs 61–63; output 60 and any of the external inputs 51–53; and any of the external outputs 61–63 and any of the external inputs 51–53. One input may drive multiple outputs. These configuration options may be used to implement fault-tolerant configurations of multiple repeaters and multiple data links.

The Transmitter Block

Figure 5:
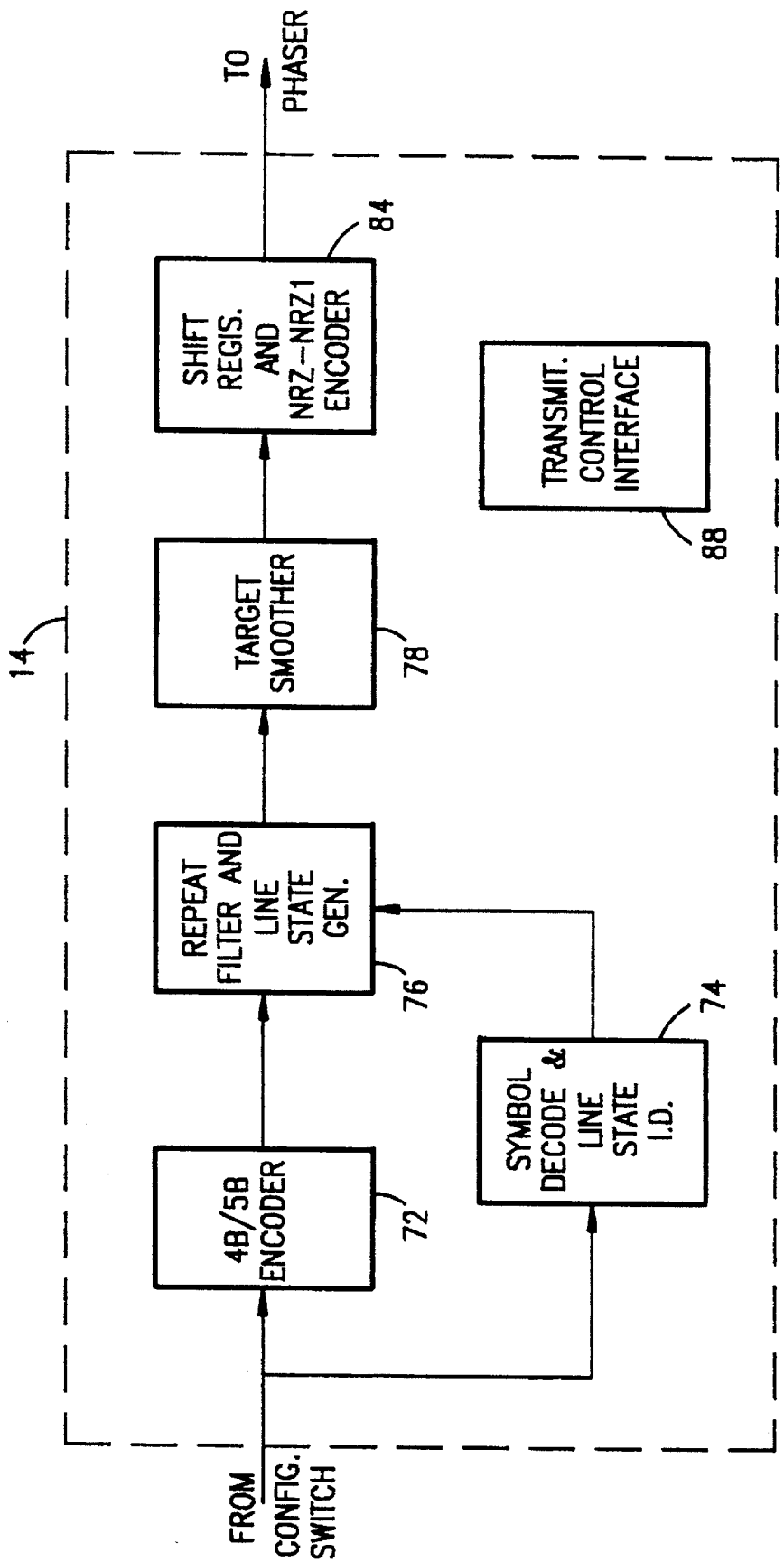
FIG. 5 is a block diagram of the transmitter of the PHY device of the present invention.

Turning to FIG. 5, the transmitter block 14 consists of the following functional blocks: 4B/5B encoder 72, symbol decode and line state identifier 74, repeat filter and line state generator 76, target smoother 78, shift register and NRZ to NRZI encoder 84, and transmitter control interface 88.

The transmitter control interface 88 contains control and status registers which provide an interface to an external device such as a microcontroller or a station management block. During operation as an intelligent repeater as shown in FIG. 1, microcontroller 9 programs two bits in a control register within transmitter control interface 88. Each of these two bits enables a separate feature within the transmitter 14.

One of these features is a pass violation symbol mode. During operation as an intelligent repeater as illustrated in FIG. 1, the pass violation symbol mode is enabled. When the pass violation symbol mode is enabled, repeat filter and line state generator 76 replaces all violation symbols with the FDDI symbol, K (10001). The K symbols are propagated to the downstream receiving station 5, where they are recognized as violations. Thus, the pass violation symbol mode allows the intelligent repeater 1 to pass all errors to the downstream station through 0 or more additional repeaters. Transmission of the K symbol as a substitute for arbitrary violation symbols maintains valid run length and DC balance on the transmission line while ensuring that a code violation will be detected at the receiving station 5.

If the pass violation symbol mode is not enabled, the repeat filter and line state generator 76 will operate according to FDDI-I and FDDI-II standards. Thus, for frames (FDDI-I data), a violation symbol will be coded as four halt symbols followed by an idle line state. For cycles (FDDI-II data), a violation symbol will be coded as one or more L symbols. When receiving neither frames nor cycles, violations are replaced with idle symbols.

Figure 6:
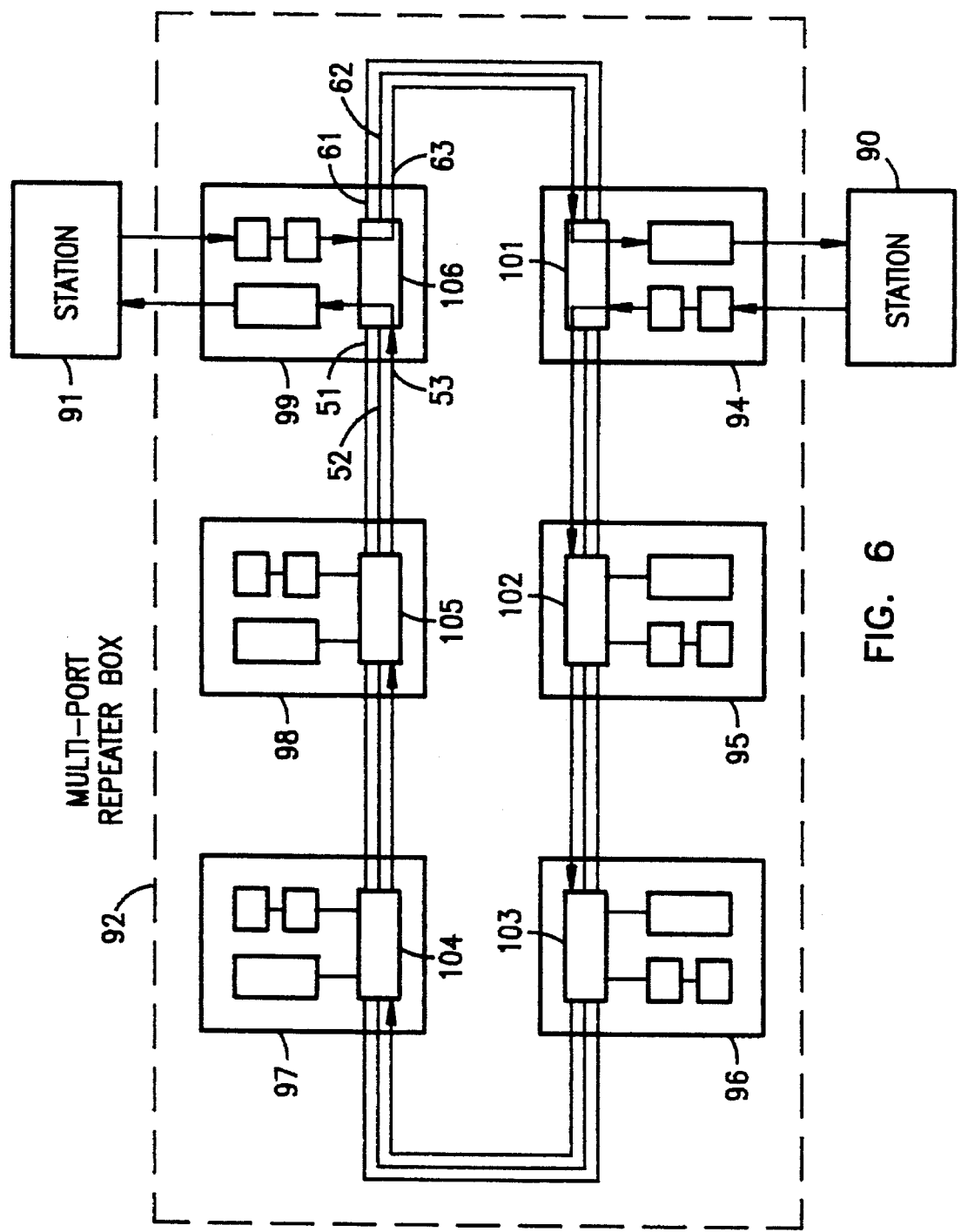
FIG. 6 is a block diagram of a multi-port repeater box formed by six of the PHY devices of the present invention.
Figure 7:
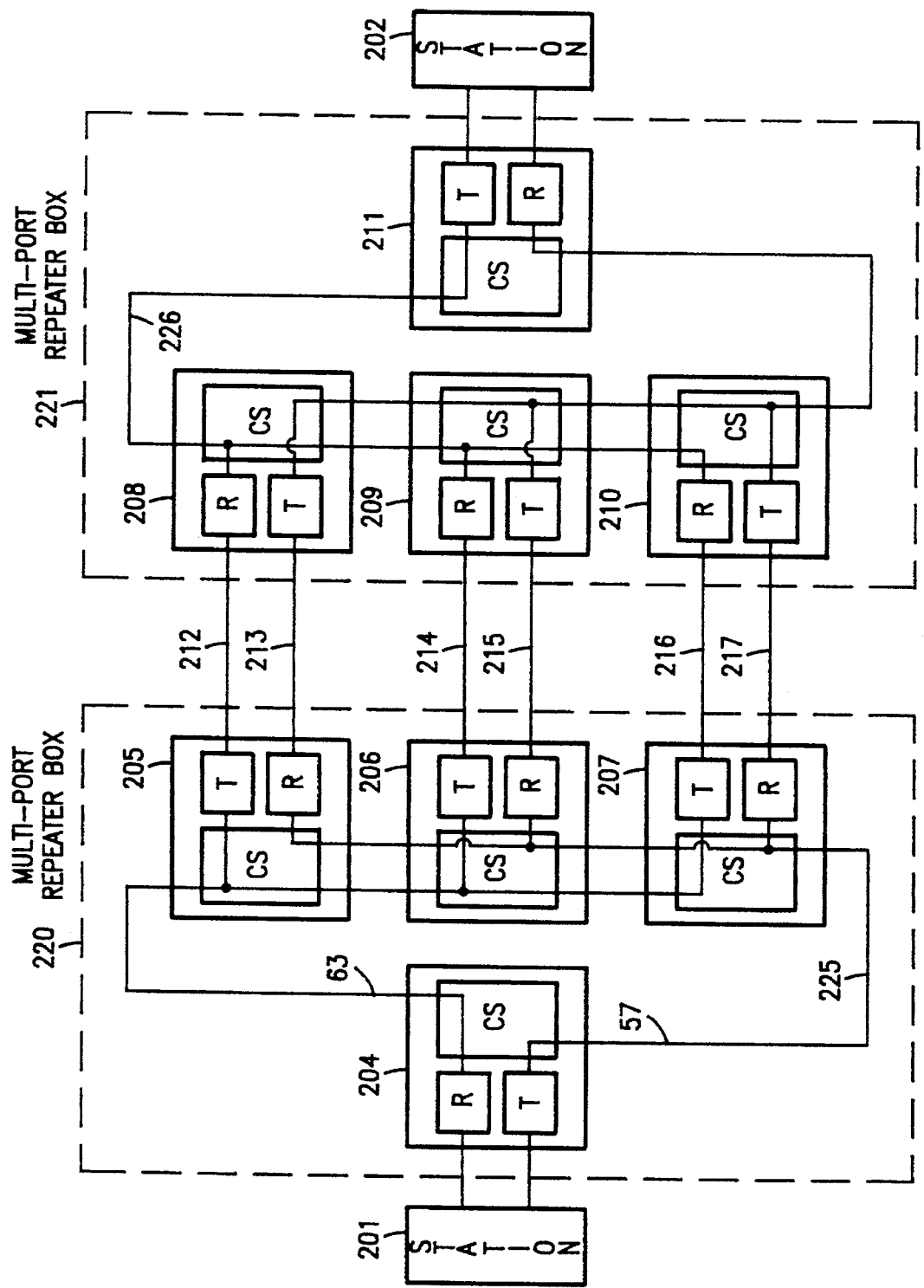
FIG. 7 is a block diagram of a circuit with redundant data links formed by multi-port repeater boxes.
Figure 8:
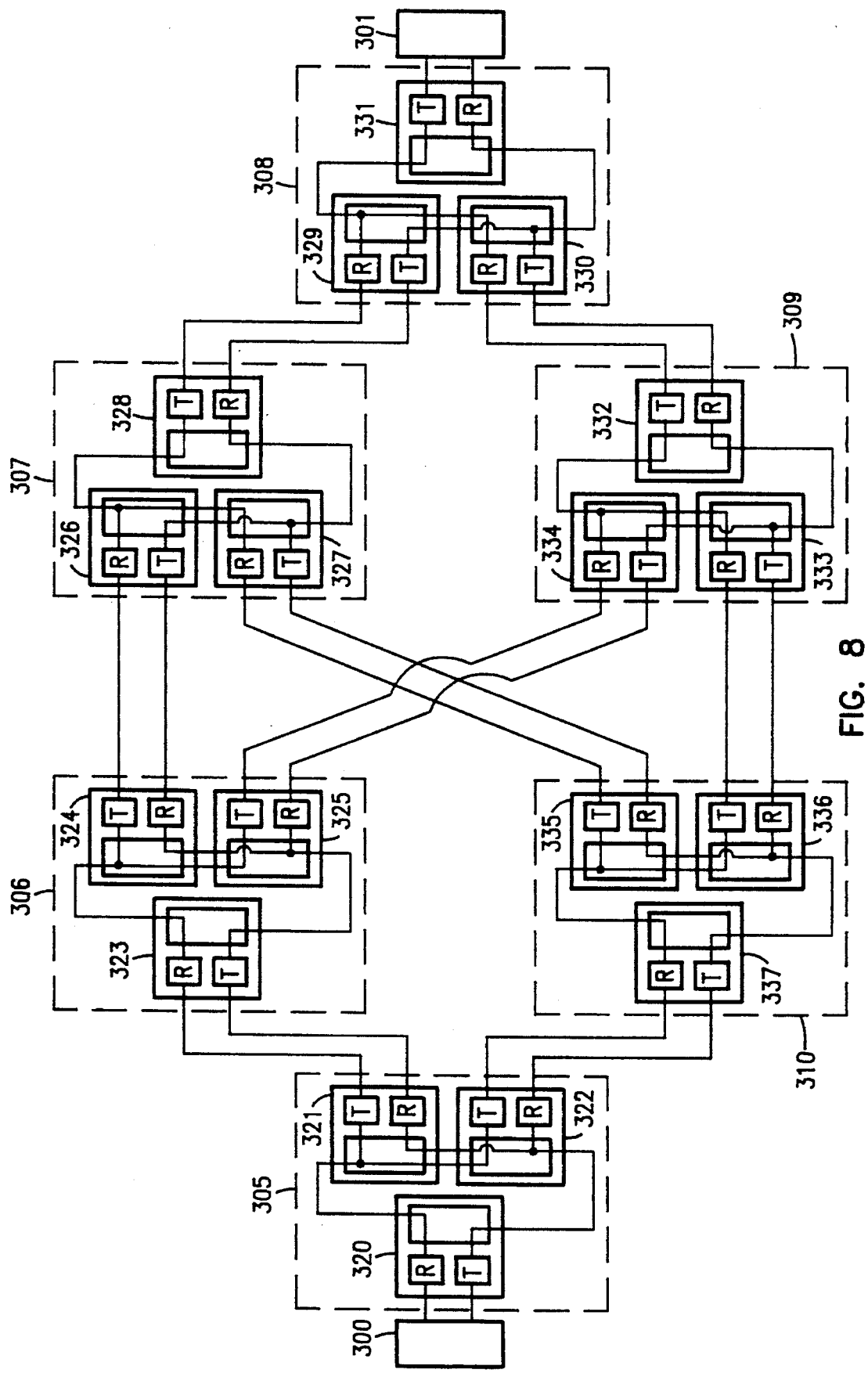
FIG. 8 is a block diagram of a fault tolerant circuit formed by multi-port repeater boxes.

The other feature which may be enabled by the transmitter control interface 88 is a pass line state mode. When the pass line state mode is enabled, if the data stream received from configuration switch 12 contains control symbols identifying a line state, the corresponding line state is generated by repeat filter 76. This effectively decouples the transmitter from the receiver and allows for sophisticated multi-port repeater configurations since the transmitter within an intelligent repeater can be functionally coupled with either the receiver of the same PHY or the receiver of another PHY as shown in FIGS. 6–8 discussed below. During operation as an intelligent repeater as illustrated in FIG. 1, the pass line state mode is enabled.

If the pass line state mode is enabled and a halt line state is decoded from the input symbols, the repeat filter and line state generator 76 will continue to generate the halt line state, until another valid line state is decoded and/or until a transmitter register is reprogrammed. That register is the Current Transmit State Register (CTSR) as indicated in Appendix A. Similarly, if a quiet line state is decoded, repeat filter and line state generator 76 will continue to generate the quiet line state until another valid line state is decoded or the register CTSR is reprogrammed. If a master line state is decoded, repeat filter and line state generator 76 will continue to generate the master line state until another valid line state is generated or the register CTSR is reprogrammed.

When the pass line state mode is not enabled, the repeat filter and line state generator 76 operates as a conventional PHY device. Thus, the repeat filter and line state generator 76 generates line states which are determined by the microcontroller 9 based on the current line state and current system conditions. These generated line states replace the incoming data from the configuration switch 12.

The following examples describes how the transmitter 14 will process a data symbol, a control symbol (which includes a violation symbol) and a line state when the pass violation symbol and pass line state modes are enabled.

To process a data symbol, the 4B/5B encoder 72 receives pairs of 4-bit symbols (along with the additional bit indicating whether these symbols represent data or control symbols) from configuration switch 12 and converts them into paired 5-bit symbols. The conversion from pairs of 4-bit data symbols to pairs of 5-bit data symbols is illustrated in the upper portion of Table C. Thus, the pair of 4-bit data symbols, 0001 and 0010, becomes 01001 10100.

The conversion from pairs of 4-bit control symbols to pairs of 5-bit control symbols is illustrated in the lower portion of Table C and in Table D. First, the letters corresponding to the 4-bit control symbols are determined from Table D. For example, the letters corresponding to the pair of 4-bit control symbols, 0000 0010 are NV. Next, the pair of 5-bit control symbols corresponding to these letters is determined from the lower portion of Table C. For example, the pair of 5-bit control symbols corresponding to NV is 11110 and 10001. As previously discussed, the violation symbol "V" is encoded as the symbol "K" (10001).

TABLE C

4B/5B Symbol Encoding

| Symbol | 4B Code | Outgoing 5B |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |
| I (Idle) | | 11111 |
| Q (Quiet) | | 00000 |
| H (Halt) | | 00100 |
| J (First Starting Delimiter Symbol) | | 11000 |
| K (Second Starting Delimiter Symbol) | | 10001 |
| T (Ending Delimiter) | | 01101 |
| R (Reset) | | 00111 |
| S (Set) | | 11001 |
| L (Packet Starting Delimiter) | | 00101 |
| N (Data mixed with Code) | | 11110 |
| V (Violation) | | 10001 (Same as "K") |

Note:
See Table D for 4-Bit Control Symbol Pairs

TABLE D

4-Bit Control Symbol Pairs Interpreted by Transmitter

| Lower Symbol | Upper Symbol | | | | | | | | | | | | | | | |
|---|---|---|---|---|---|---|---|---|---|---|---|---|---|---|---|---|
| | 0000 N | 0001 H | 0010 V | 0011 Vx | 0100 L | 0101 T | 0110 R | 0111 S | 1000 | 1001 | 1010 I | 1011 Ix | 1100 Px | 1101 J | 1110 Px | 1111 Px |
| 0000 | N | | HN | VN | kALS | LN | TN | RN | SN | | | IN | kALS | P | P | P | P |
| 0001 | H | NH | HH | VH | kILS | LH | TH | RH | SH | | | IH | kILS | P | P | P | P |
| 0010 | V | NV | HV | VV | kNSD | LV | TV | RV | SV | | | IV | kNSD | P | P | P | P |
| 0011 | | | | VO3 | kCLS | | | | | | | IO3 | kCLS | P | P | P | P |
| 0100 | L | NL | HL | VL | kMLS | LL | TL | RL | SL | | | IL | kMLS | P | P | P | P |
| 0101 | T | NT | HT | VT | kHLS | LT | TT | RT | ST | | | IT | kHLS | P | SMC | P | P |
| 0110 | R | NR | HR | VR | kQLS | LR | TR | RR | SR | | | IR | kQLS | P | P | P | P |
| 0111 | S | NS | HS | VS | kNLS | LS | TS | RS | SS | | | IS | kNLS | P | SSC | P | P |
| 1000 | | | | V08 | UALS | | | | | | | IO8 | uALS | P | P | P | P |
| 1001 | | | | V09 | uILS | | | | | | | IO9 | uILS | P | P | P | P |
| 1010 | I | NI | HI | VI | P | LI | TI | RI | SI | | | II | P | P | SAS | P | P |
| 1011 | Y | | | VOB | uCLS | | | | | | | IOB | uCLS | P | SCC | P | P |
| 1100 | | | | VOC | uMLS | | | | | | | IOC | uMLS | P | P | P | P |
| 1101 | K | | | VOD | uHLS | | | | | | | IOD | uHLS | P | SFS | P | P |
| 1110 | | | | VOE | uQLS | | | | | | | IOE | uQLS | P | P | P | P |
| 1111 | | | | VOF | uNLS | | | | | | | IOF | uNLS | P | P | P | P |

To process line state information, the symbol decode and line state identifier 74 of transmitter block 14 receives the current line state information in the form of paired 4-bit symbols from the configuration switch 12. The symbol decode and line state identifier 74 identifies the current line state from the paired 4-bit symbols in accordance with Table D. Thus, the 4-bit symbol pair, 1011 0101, is identified as a known halt line state. The symbol decode and line state identifier 74 then sends a control signal to the repeat filter and line state generator 76. This control signal causes the repeat filter and line state generator 76 to generate a pair of 5-bit symbols corresponding to the identified line state. For example, the 5-bit symbol pair for a known halt line state would be 00100 00100.

The remainder of the transmitter block 14 operates as follows. The target smoother 78 operates to control the preamble length of frames and cycles. The target smoother 78 is coupled to the shift register and NRZ to NRZI encoder 84 which converts encoded parallel data to serial data and also converts from NRZ to NRZI data, if necessary. The shift register and NRZ to NRZI encoder 84 then sends the serial data through the phaser 2 to the receiving station 5.

In an alternate embodiment, PHY devices of the present invention are connected to form a multi-port repeater box serving several stations or providing fault redundancy. Such an embodiment is illustrated in FIG. 6 and is not limited to FDDI permitted topologies or FDDI technology. Note that the repeater box 92 lacks station management capabilities. Here, PHY devices 94–99 are used to connect station 90 and station 91 in a looped configuration. The data from station 90 is provided to the receive path of PHY device 94. The multiplexers in configuration switch 101 are adjusted to route the data stream through the configuration switch to one of the output paths as indicated by the arrowed line. The multiplexers in configuration switches 102–105 are adjusted to route the data stream directly through configuration switches 102–105 along a single path indicated by the arrowed lines. Inputs 51–53 and outputs 61–63 (FIG. 4) are used for that purpose. In configuration switch 106, the multiplexers are adjusted to route the data path through the transmitter path of PHY device 99. The data path is then provided to station 91. Station 91 transmits a data stream to the receive path of PHY device 99. The multiplexers in configuration switch 106 are adjusted to route the data stream through the configuration switch 106 to an output path as indicated by an arrowed line. This output path is connected to an input path of configuration switch 101. This input path is connected to the transmitter path of PHY device 94 by the multiplexers in configuration switch 101. The data path is coupled from the transmitter path of PHY device 94 to the input port of Station 90, thereby completing the loop. Although this example illustrates a specific path, other paths may be chosen with three paths and six ports, any three pairs of ports can simultaneously be provided with full duplex repeater capabilities.

In another embodiment shown in FIG. 7, multiple intelligent repeaters 204–211 are configured to form multi-port repeater boxes 220 and 221. Inputs 51–53 and outputs 61–63 of each repeater are used as needed. These repeater boxes 220 and 221 provide redundant data links 212–217 between two stations 201, 202. The transmitter, receiver and configuration switch within each of the intelligent repeaters 204–211 are identified by the letters T, R, and CS, respectively. The link with the best properties (e.g. lowest delay, lowest link error rate, etc.) is selected by the repeater boxes 220 and 221. The data is transmitted simultaneously onto all links, however, only one receiver in intelligent repeaters 205–207 transfers its data onto the internal path 225 using the configuration switch at any given time. Only one of the receivers in intelligent repeaters 208–210 transfers its data onto the internal path 226 using the configuration switch at any given time. This embodiment allows for reconfiguration around degrading or broken links. This embodiment is not limited to the three links shown.

In another embodiment shown in FIG. 8, multiple intelligent repeaters 320–337 are configured to provide multi-port repeater boxes 305–310. These repeater boxes 305–310 are configured as a fault tolerant network connecting stations 300 and 301. This fault tolerant network allows for continued operation between stations 300 and 301 in the event of a fault along any single pair of connectors between any two of the repeater boxes 305–310. This fault tolerant configuration also allows for continued operation between stations 300 and 301 in the event that any one of the repeater boxes 305–310 becomes inoperable. The transmitter and receiver within each of the intelligent repeaters 320–337 are identified by the letters T and R, respectively. The unlabeled box within each of the intelligent repeaters 320–337 is a configuration switch.

Although these examples illustrate specific configurations of multi-port repeater boxes, other configurations will be apparent to those of ordinary skill in the art.

It should be understood that various alternatives to the embodiments of the invention described herein may be employed in practicing the invention. It is intended that the following claims define the scope of the invention and that the structures and methods within the scope of these claims and their equivalents be covered thereby.

Appendix A
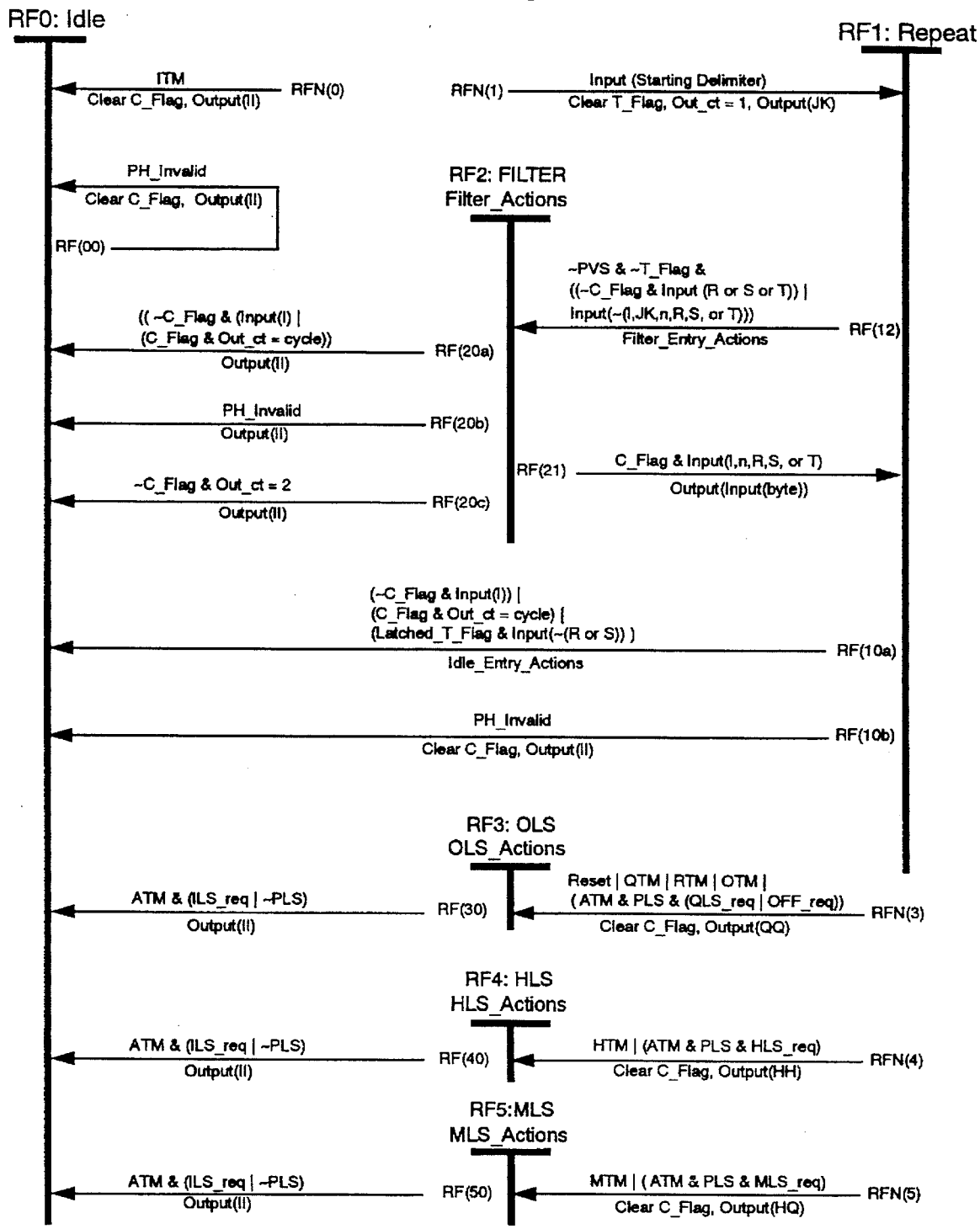

Transmitter Repeat Filter/Line State Generator State Actions and Design Notes

Idle Actions

FOR EACH Input(symbol) DO
        IF (~State_Transition)
            THEN Output(I)
        IF (Input(~(I,JK,n,R,S, or T)) & PVS)
            THEN Output(K)

Repeat Actions

FOR EACH Input(byte) DO
        IF (~C_Flag & Upper_symbol(T)
            THEN SET T_Flag IF (~State_Transition)
            THEN Output(Input(byte))
            Increment Out_ct
        IF (Input(~(I,JK,n,R,S, or T)) & PVS)
            THEN Output(K)

QLS Actions

FOR EACH Input(byte) DO
        IF(~State_Transition)
            THEN Output(QQ)

HLS Actions

FOR EACH Input(byte) DO
        IF(~State_Transition)
            THEN Output(HH)

MLS Actions

FOR EACH Input(byte) DO
        IF (~State_Transition)
            THEN Output(HQ)

Filter Actions and Filter_Entry_Actions if (rf12 | rf20c | (rf2 & ~global & ~rf20a & ~rf20b & ~rf21)) then (
        if (C_Flag) then (
            if (usym_RSTI)
                then (us_out[4:0] = usx[4:0]),
            else if (us_N & ls_I)
                then (us_out[4:0] = I_sym),
                else (us_out[4:0] = L_sym),
        if (lsym_RSTI)
            then (ls_out[4:0] = lsx[4:0]),
        else if (us_I & ~ls_L)
            then (ls_out[4:0] = I_sym),

```
                            else (ls_out[4:0] = L_sym) ),
        else (us_out[4:0] = H_sym,
              ls_out[4:0] = H_sym)
)
```

Idle Entry Actions

```
if rf10a then (
    if (T_Flag) then (
        if (us_I & lsym_RSTI | ~usym_RSTI & ~pvs)
            then (us_out[4:0] = T_sym),
        else if (usym_RSTI)
            then (us_out[4:0] = usx[4:0]),
            else (us_out[4:0] = K_sym),
        if (lsym_RSTI)
            then (ls_out[4:0] = lsx[4:0]),
            else if (pvs)
                then (ls_out[4:0] = K_sym),
                else if ((us_out = I_sym) |
                         (us_out = T_sym) & (Out_ct = 2))
    then (ls_out[4:0] = I_sym),
    else (ls_out[4:0] = T_sym) ),
        else if (C_Flag) then (
            if (us_I | ~pvs)
                then (us_out[4:0] = I_sym),
                else (us_out[4:0] = K_sym),
            if (ls_I | ~pvs)
                then (ls_out[4:0] = I_sym),
            else (ls_out[4:0] = K_sym) ),
        else (if (us_I | us_N)
            then (us_out[4:0] = I_sym),
            else if (us_H | ~pvs)
                then (us_out[4:0] = H_sym),
                else (us_out[4:0] = K_sym),
            if (us_out[4:0] = H_sym)
                then (ls_out[4:0] = H_sym),
                else if (ls_I | ~pvs)
                    then (ls_out[4:0] = I_sym),
                    else (ls_out[4:0] = K_sym) )
)
```

KEY

Programmed into Transmit Control Block's Current Transmit State Register - CTSR:
ATM = Active Transmit Mode
QTM = Quiet Transmit Mode
RTM = Reserved Transmit Mode
OTM = Off Transmit Mode
HTM = Halt Transmit Mode
MTM = Master Transmit Mode
ITM = Idle Transmit Mode PLS = Pass all Line States PVS = Pass Violation Symbols (EACP = 0) PH_Invalid = Anything in last 4 columns of Code table except Starting Delimiters and also anything in the V' or X' columns except ILS, ALS and CLS.
(EACP = 1) PH_Invalid = Anything in the last 2 columns of Code Point Table QLS_Req = Quiet Line State decoded (V'x or I'x = QLS)
HLS_Req = Halt Line State decoded (V'x or I'x = HLS)
MLS_Req = Master Line State decoded (V'x or I'x = MLS)
ILS_Req = Off Line State decoded (V'x or I'x = ILS)
OFF_Req = Off Line State decoded (V'x or I'x = OFF)

Receiver Pass All Symbols (PAS) Design Notes

The signal PRMR_PAS coming from the receiver control block (registers) enables symbol passing. The HMUX Receiver block within the receiver uses PRMR_PAS to control a 10-bit wide MUX using FORCE signals (see Output Byte Assembly). The HMUX Receiver, described in part by in HMUX Receiver State Machine Actions below (see FDDI Hybrid Ring Control draft ANSI standard for complete description of HMUX Receiver functionality), performs a filtering function by asserting various FORCE signals.

The FORCE signals cause the incoming data stream to be replaced (filtered) by known code point values. However, the PRMR_PAS signal gates all FORCE signals. If PRMR_PAS is asserted, no FORCE signals will be asserted. This allows the Output Byte MUX to simply pass (unfiltered) the incoming data stream. The data stream is represented by two 4-bit symbols called ls[3:0] and us[3:0].

HMUX Receiver State Machine Actions:

```
HRX0:   ; Preamble
        if (rx_ct[0])
                then ( CYCLE_LATE <- 0 ),
        afterPAmax = rx_ct[2],  ; byte #4
        if ( afterPAmax & C_Flag )
                then ( setLflag = 1,
                        L_Flag <- 1 )
HRX1:   ; Cycle Control field
        FORCE_WW = ~PRMR_PAS,                           ;force R, S or T
hrx2:   ; Cycle Sequence field
        FORCE_00 = (CS_RC[7:0] = 00) & ~PRMR_PAS        ; force zero if invalid CSrc
hrx3:   ; Programming Template field
        FORCE_WW = ~PRMR_PAS,  ; force R, S or T
hrx4:   ; Cycle Body
        FORCE_GG = ~PRMR_PAS,  ; force N, I, L, R, S or T
HRX5:   ; Frame
        if ( ~NN )
                then ( T_Flag <- 1 ),
        if ( T_Flag )
                then ( FORCE_YY = ~PRMR_PAS ),  ; force I, L, R, S or T
                else ( FORCE_GG = ~PRMR_PAS ),  ; force N, I, L, R, S or T
```

Output Byte Assembly

```
1: ; Output Byte Assembly
        DDOUT[9] = ~DDOUT[8] ! (uparity ! lparity),
        if ( ~(FORCE_00 | FORCE_WW | FORCE_YY | FORCE_GG) ) ;NO filtering (eg. PAS = 1)
                then ( DDOUT[8] = ~NN,
                        DDOUT[7:4] = usl[3:0], uparity = usl[4],
                        DDOUT[3:0] = lsl[3:0], lparity = lsl[4]),
        if ( FORCE_00 )
                then ( DDOUT[8:0] = 0 ),  ; always generates correct parity
        if ( FORCE_WW )
                then ( DDOUT[8] = 1,
                        if ( WX )
                                then ( DDOUT[7:4] = usl[3:0], uparity = usl[4] ),
                                else ( DDOUT[7:4] = codeT[3:0], uparity = codeT[4] ),
                        if ( XW )
                                then ( DDOUT[3:0] = lsl[3:0], lparity = lsl[4] ),
                                else ( DDOUT[3:0] = codeT[3:0], lparity = codeT[4] ) ),
        if ( FORCE_YY )
                then ( DDOUT[8] = 1,
                        if ( yx )
```

```
                    then ( DDOUT[7:4] = usl[3:0], uparity = usl[4] ),
                    else ( DDOUT[7:4] = codeL[3:0], uparity = codeL[4] ),
            if ( xy )
                    then ( DDOUT[3:0] = lsl[3:0], lparity = lsl[4] ),
                    else if ( lx )
                            then ( DDOUT[3:0] = codel[3:0], lparity = codel[4] ),
                            else ( DDOUT[3:0] = codeL[3:0], lparity = codeL[4] ) ),
if ( FORCE_GG )
        then (
            if ( NN )
                then ( DDOUT[8] = 0,
                        DDOUT[7:4] = usl[3:0], uparity = usl[4],
                        DDOUT[3:0] = lsl[3:0], lparity = lsl[4] ),
                else ( DDOUT[8] = 1,
                    if ( Gx )
                            then ( DDOUT[7:4] = usl[3:0], uparity = usl[4] ),
                            else ( DDOUT[7:4] = codeL[3:0], uparity = codeL[4] ),
                    if ( xG )
                            then ( DDOUT[3:0] = lsl[3:0], lparity = lsl[4] ),
                            else if ( lx )
                                    then ( DDOUT[3:0] = codel[3:0], lparity = codel[4] ),
                                    else ( DDOUT[3:0] = codeL[3:0], lparity = codeL[4] )
        )
```

Enable Noise Filtering Design Notes

The following equations describe the Noise Filtering design:

```
if (noise_thresh_reached) then rcra[5] <- 1,
if ( rcra[5] & prmr_ensf ) then FILTER_NOISE <- 1,
if ( ~rcra[5] | ~SM_IND[3] & Stuff | Start | PRST | ~prmr_ensf) then FILTER_NOISE <- 0
``` where:

> noise_thresh_reached = no known line state received for a programmed amount of time > prmr_ensf = Enable Noise Filtering signal from the Receiver control block registers > FILTER_NOISE = the control signal which causes the incoming data stream to be replaced with a PHY_INVALID code point. This code point, when decoded by a transmitter, will cause Off line state to be transmitted.

> ~SM_IND[3] & Stuff = a known line state received

> Start = a start of frame or start of cycle received

> PRST = Reset

What is claimed is:

1. A plurality of physical layer devices for use in a communication system, each physical layer device comprising:

a transmitter for receiving symbols and for transmitting symbols to a downstream station in response to the symbols received by the transmitter, said transmitter having a first mode in which once the transmitter detects that the received symbols indicate any valid line state, said transmitter transmits symbols identifying the detected valid line state, wherein said plurality of said physical layer devices are connected to form a multi-port repeater box, said multi-port repeater box coupling two or more communication stations.

2. A plurality of physical layer devices each comprising:

a transmitter for receiving symbols and for transmitting symbols to a downstream station in response to the symbols received by the transmitter, said transmitter having a first mode in which once the transmitter detects that the received symbols indicate any valid line state, said transmitter transmits symbols identifying the detected valid line state; and a configuration switch which allows said transmitter to be operably coupled to either a receiver of said physical layer device or to a receiver of a separate physical layer device, wherein said physical layer devices are interconnected to form a fault-redundant repeater network having redundant links and also having repeaters, wherein said fault redundant repeater network remains operable during an outage of a link, wherein the operability during the outage is provided by a redundant link.

3. A plurality of physical layer devices each comprising:

a transmitter for receiving symbols and for transmitting symbols to a downstream station in response to the symbols received by the transmitter, said transmitter having a first mode in which once the transmitter detects that the received symbols indicate any valid line state, said transmitter transmits symbols identifying the detected valid line state; and a configuration switch which allows said transmitter to be operably coupled to either a receiver of said physical layer device or to a receiver of a separate physical layer device, wherein said physical layer devices are interconnected to form a fault-redundant repeater network having links and redundant repeaters, wherein said fault redundant repeater network remains operable during an outage of a repeater, wherein the operability during the outage is provided by a redundant repeater.

4. A physical layer device having a transmitter, said transmitter comprising:

an input port;

an output port;

a first circuitry having an input connected to said input port and having an output;

a repeat filter and line state generator having a first input connected to the output of said first circuitry, said repeat filter and line state generator also having a second input and an output;

a line state identifier having an input connected to said input port and an output connected to the second input of said repeat filter and line state generator;

a second circuitry having an input connected to said output of said repeat filter and line state generator and having an output connected to said output port of said transmitter.

5. The physical layer device of claim 4, wherein said first circuitry comprises an encoder.

6. A physical layer device for use in a Fiber Distributed Data Interface II (FDDI-II) communication system, said physical layer device comprising a receiver for receiving symbols from an upstream station and for generating symbols in response to the received symbols, wherein said receiver comprises a hybrid multiplexor receiver (HMUX receiver) for checking validity of an FDDI-II cycle when the received symbols are symbols of an FDDI-II cycle, wherein the HMUX receiver is programmable to a first mode or a second mode, wherein in the first mode the HMUX receiver causes the receiver to pass the received symbols without filtering, and wherein in the second mode the HMUX receiver causes the receiver to filter violation symbols from the received symbols.

7. The physical layer device of claim 6, further comprising a transmitter for receiving symbols and for transmitting symbols to a downstream station in response to the symbols received by the transmitter, said transmitter having a first mode in which in at least one line state, when the transmitter detects a violation symbol, said transmitter transmits a preselected symbol recognizable as a violation symbol by a downstream station, said transmitter having a second mode in which in at least one line state, when the transmitter detects a violation symbol, said transmitter transmits a symbol or symbols different from said preselected symbol, said symbol or symbols recognizable as a violation by said downstream station; and a register having one or more programmable bits for enabling said first mode or said Second mode of said transmitter.

8. The physical layer device of claim 7, wherein said preselected violation symbol is the FDDI symbol K.

9. The physical layer device of claim 7, wherein said register is programmable by a device external to said physical layer device.

10. The physical layer device of claim 9, further comprising means for passing to said transmitter symbols generated by said receiver.

11. The physical layer device of claim 6, wherein in said second mode, said HMUX receiver causes the receiver to filter symbols not valid in their present context.

12. The physical layer device of claim 6 further comprising a register having one or more programmable bits for enabling said first mode or said second mode of said receiver, wherein said register is programmable by a device external to said physical layer device.

13. A physical layer device having a receiver, said receiver comprising:

an input port;

an output port;

a shifter coupled to said input port, said shifter having an output;

a framer having an input coupled to the output of said shifter, said framer also having an output;

a symbol decoder having an input coupled to the output of said framer, said symbol decoder also having a first output and a second output;

a post decoder having a first input coupled to the first output of said symbol decoder, said post decoder also having a second input and a third input and an output;

a line state detector having an input coupled to the second output of said symbol decoder, said line state detector also having an output coupled to the second input of said post decoder;

a hybrid multiplexor (HMUX) receiver having an input coupled to the second output of said symbol decoder, said HMUX receiver also having an output coupled to the third input of said post decoder; and an elasticity buffer having an input coupled to the output of said post decoder, said elasticity buffer having an output coupled to said output port.

14. The physical layer device of claim 13, wherein said receiver is capable of receiving symbols from an upstream station and generating symbols in response to the received symbols, and wherein said receiver has a first mode in which said HMUX receiver allows said post decoder to pass all symbols without filtering.

15. The physical layer device of claim 14, wherein said receiver has a second mode in which said HMUX receiver causes said post decoder to filter violation symbols.

16. The physical layer device of claim 15, wherein in said second mode, said HMUX receiver causes said post decoder to filter symbols not valid in their present context.

17. The physical layer device of claim 15, further comprising a register having one or more programmable bits for enabling said first mode or said second mode.

18. A method for repeating symbols transmitted for reception by a downstream station in a Fiber Distributed Data Interface II (FDDI-II) communication system, said method comprising the steps of:

receiving symbols from an upstream station; and generating by a receiver symbols in response to the received symbols, the generating step comprising:

checking by a hybrid multiplexor receiver (HMUX receiver) the validity of an FDDI-II cycle when the received symbols are symbols of an FDDI-II Cycle;

if the HMUX receiver is in a first mode, then passing by the receiver the received symbols without filtering, and if the HMUX receiver is in a second mode, then filtering by the receiver violation symbols from the received symbols.

19. The method of claim 18, further comprising the step of filtering by the receiver, in said second mode, symbols not valid in their present context.

20. The method of claim 18, further comprising the step of setting one or more programmable bits in a register to enable said first mode or said second mode.

21. A physical layer device for use in a Fiber Distributed Data Interface II (FDDI-II) communication system, said physical layer device comprising a receiver for receiving symbols from an upstream station and for generating symbols in response to the received symbols, wherein said receiver comprises a hybrid multiplexor receiver (HMUX receiver) for checking validity of an FDDI-II cycle when the received symbols are symbols of an FDDI-II cycle, wherein the HMUX receiver is programmable to a first mode or a second mode, wherein in the first mode the HMUX receiver causes the receiver to pass the received symbols without filtering, and wherein in the second mode the HMUX receiver causes the receiver to filter, from the received symbols, symbols not valid in their present context.

22. A method for repeating symbols transmitted for reception by a downstream station in a Fiber Distributed Data Interface II (FDDI-II) communication system, said method comprising the steps of:

receiving symbols from an upstream station; and generating by a receiver symbols in response to the received symbols, the generating step comprising:

checking by a hybrid multiplexor receiver (HMUX receiver) the validity of an FDDI-II cycle when the received symbols are symbols of an FDDI-II cycle;

if the HMUX receiver is in a first mode, then passing by the receiver the received symbols without filtering, and if the HMUX receiver is in a second mode, then filtering by the receiver, from the received symbols, symbols not valid in their present context.

23. The method of claim 22, further comprising the step of programming one or more bits in a register to enable said first mode or said second mode.

* * * * *